United States Patent
Schehl

(10) Patent No.: US 6,959,611 B2
(45) Date of Patent: Nov. 1, 2005

(54) FLOW METER HAVING A REBOUNDING PLATE WITH A FILTER ASSEMBLY

(75) Inventor: Ulrich Schehl, Annweiler am Trifels (DE)

(73) Assignee: Watts Industries Deutschland, Landau (DE)

(*) Notice: Subject to any disclaimer, the term of this patent is extended or adjusted under 35 U.S.C. 154(b) by 0 days.

(21) Appl. No.: 10/840,220

(22) Filed: May 7, 2004

(65) Prior Publication Data

US 2004/0231433 A1 Nov. 25, 2004

(30) Foreign Application Priority Data

May 22, 2003 (DE) ........................................ 203 07 977

(51) Int. Cl.[7] .............................. G01F 1/11; F16K 37/00
(52) U.S. Cl. ..................... 73/861.93; 137/559; 137/557
(58) Field of Search ........................ 73/861.93, 861.74, 73/861.71, 861.75, 861.88; 137/559, 557, 556.3, 556, 552

(56) References Cited

U.S. PATENT DOCUMENTS 2,891,570 A * 6/1959 Krupp ........................ 137/509
3,881,354 A * 5/1975 Block ........................ 73/861.71
6,089,264 A    7/2000 Spiess ........................ 137/559
6,739,362 B2 * 5/2004 Lell ............................ 141/313

FOREIGN PATENT DOCUMENTS

EP           0884514 A1       12/1998

* cited by examiner

Primary Examiner—Harshad Patel
(74) Attorney, Agent, or Firm—Birch, Stewart, Kolasch & Birch, LLP

(57) ABSTRACT

A flow meter, particularly for warm water heating systems, includes a measuring element and an indicator element. The indicator element has a basic component with a cylindrical attachment extending into the collector pipe. An indicator rod with a rebounding plate extends into the measuring element and vertically slidable. According to the invention, a filter is installed ahead of the rebounding plate in the flow direction of the heating medium. Where the basic component extends to a cylindrical attachment affecting the flow against the rebounding plate, it is suitable to provide a number of slits in the cylindrical external wall of the lower portion of the attachment, the slits being distributed around the perimeter parallel to the axis. In this manner, dirt particles, which could impair the function of the indicator, are virtually filtered out.

18 Claims, 3 Drawing Sheets

Fig. 3a
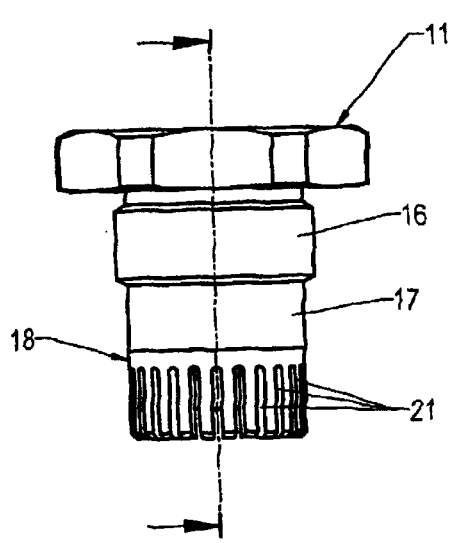
Fig. 3d
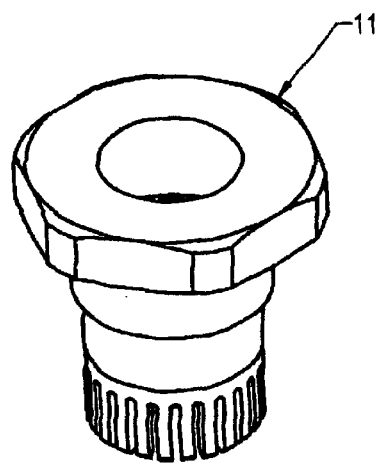
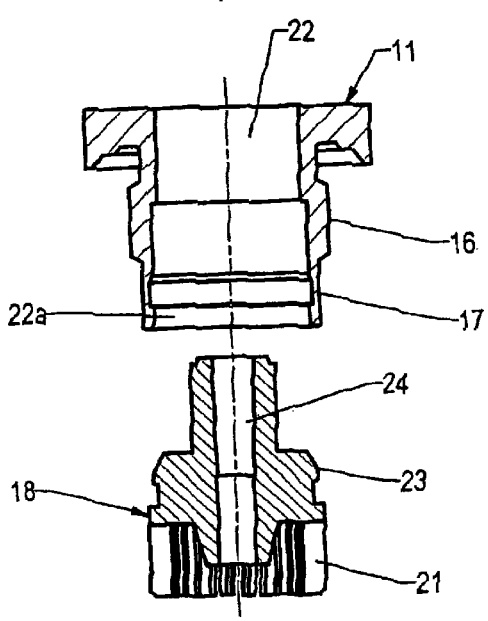
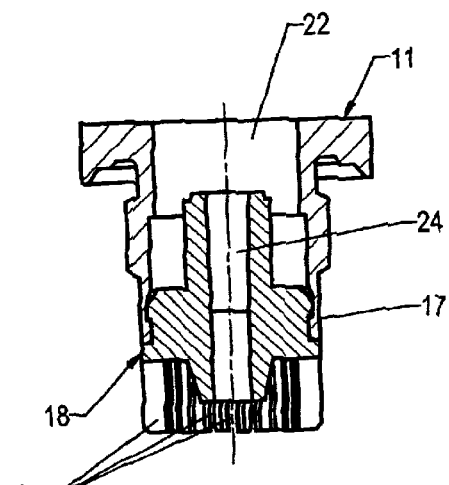
Fig. 3c
Fig. 3b

FLOW METER HAVING A REBOUNDING PLATE WITH A FILTER ASSEMBLY

This nonprovisional application claims priority under 35 U.S.C. §119 on German Patent Application No. DE 203 07 977.9 filed in Germany on May 22, 2003, which is herein incorporated by reference.

BACKGROUND OF THE INVENTION

1. Field of the Invention

The present invention relates to a flow meter, particularly for warm water heating systems.

2. Description of the Background Art

Flow meters of this type for flowing liquids are generally known. They are frequently used in warm water heating systems to register partial flows of a heating medium in various pipe lines, or branch lines, and to be able to monitor them during operation. Flow meters of this kind have an indicator scale, of which the respective position of an indicator rod, having a rebounding plate that is influenced by the flowing medium, can be read. Conventionally, the indicator scale is usually arranged on a surface of an inspection glass along a line.

In a conventional flow meter of this type, for example, as described in EP 0 884 514 B1, the indicator element as well as the measuring element are screwed opposite of each other with cylindrical attachments into a collector pipe, whereby a gap is formed between the lower end of the indicator element and the upper end of the measuring element. If such a flow meter is not used in the return flow, as taught in EP 0 884 514 B1, where the rebounding plate of the indicator rod is slidable in the internal bore of the measuring element and is exposed to direct flow, but is used in the forward flow, then it is necessary to influence the flow against the rebounding plate in order to avoid any turbulence of the flow against the rebounding plate. This is accomplished, for example, by arranging a pipe-shaped attachment in the area between the lower end of the indicator element and the upper end of the measuring element, which bridges this gap for the most part and is provided with openings, which influence the flow-through.

It was found in actual operation that in warm water heating systems, particularly after operation of the system was started or after the system was serviced, sharp-edged dirt particles are often transported with the heating medium. Since the annular gap between the outer perimeter of the rebounding plate and the internal bore of the measuring element is, for flow-technical reasons, very narrow, the danger exists that such dirt particles can get jammed or clogged in this annular gap, thereby blocking the function of the indicator.

SUMMARY OF THE INVENTION

It is therefore an object of the present invention to provide a flow meter that avoids an impairment of the measuring process by dirt particles without disturbing the steady flow against the rebounding plate.

The invention is based on the idea to install a filter ahead, e.g., upstream, of the rebounding plate in the flow direction of the heating medium to filter out dirt particles that could impair the function of the indicator. It is advantageous, for practical purposes, to design this filter in the form of longitudinal slits in the external wall of the cylindrical attachment, which is an extension of the cylindrical part of the basic component of the indicator element extending in the direction of the measuring element.

It is considered particularly beneficial to design this attachment as an insert, which can be made of metal or, in particular, of plastic, and can be installed by insertion into the internal bore of the cylindrical part of the basic component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 3a–d show various illustrations of a basic component of an indicator element of the flow meter;

DETAILED DESCRIPTION

Figure 1:
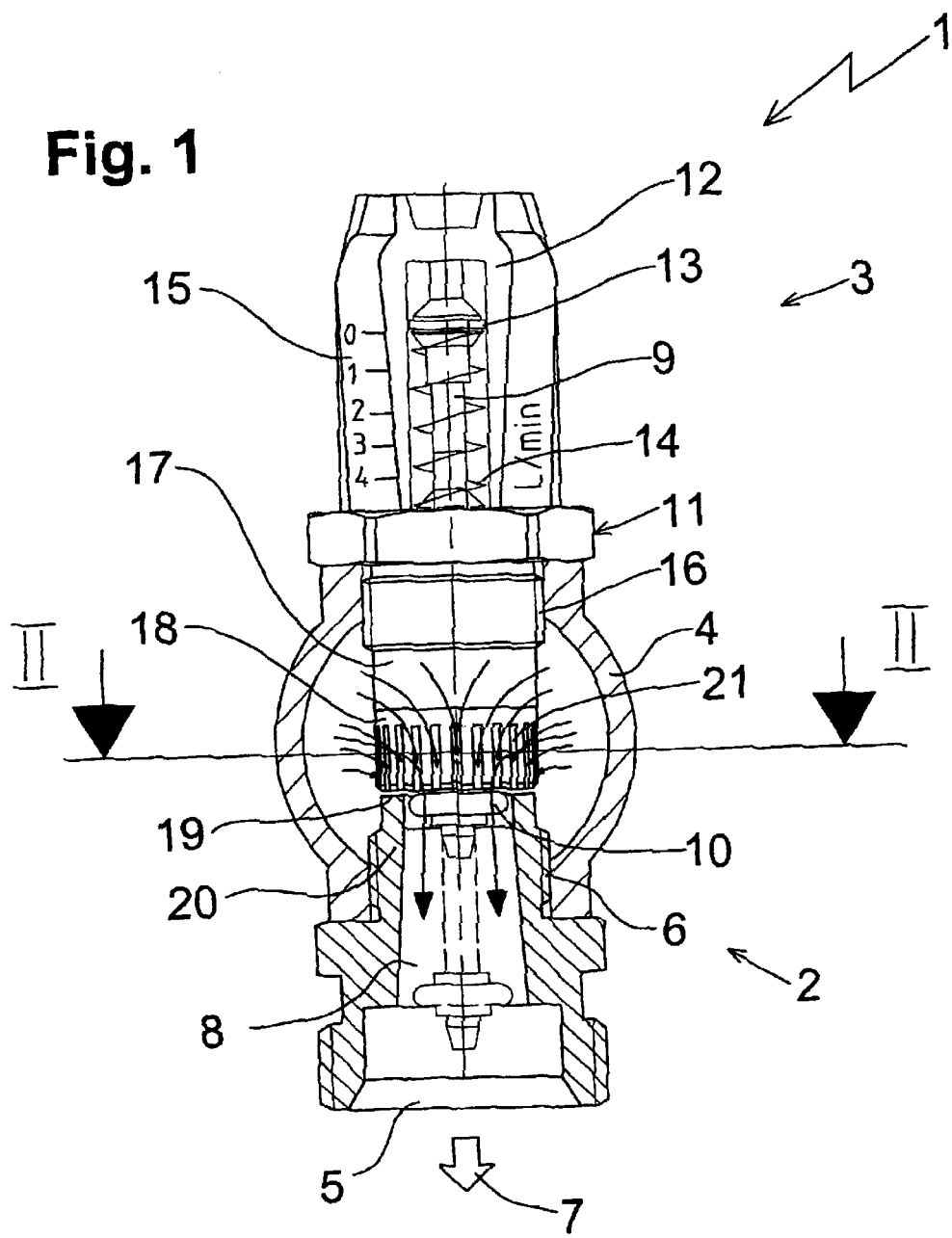
FIG. 1 is a partial cross-section of a side view of a flow meter mounted on a collector pipe according to a preferred embodiment of the invention.

The flow meter 1, which is illustrated in FIG. 1, including a measuring element 2 and an indicator element 3, is mounted on a forward-flow distribution pipe 4 of a warm water heating system and measures the forward flow, in the direction of arrow 7, in an individual branch line 5. It is common practice to arrange several such flow meters next to one another on the distribution pipe 4 for various branch lines.

The measuring element 2, which is tightly screwed into the distribution pipe 4 by an external screw thread 6, has a connecting branch line 5, which is not actually illustrated but only indicated by the arrow 7, which is pointing in the flow direction. As is principally standard practice, a rebounding plate 10, which is supported by an indicator rod 9, is located in a measuring bore 8 of the measuring element 2. The measuring bore 8 is conically enlarged towards the branch line 5, whereby the position of the rebounding plate 10 along the measuring bore 8 depends on the respective flow-through.

The indicator element 3 is mounted opposite the measuring element 2 on top of the distribution pipe 4. The indicator element 3 includes a basic component 11 that is tightly screwed together with the distribution pipe 4 and has a tube-shaped inspection glass 12 that is made of, for example, transparent material. The indicator rod 9 is guided in the indicator element 3 so that it can slide vertically, e.g., in the flow direction, and has a disk-shaped pointer 13 close to its upper end, which moves up and down in the bore of the inspection glass 12, depending on the position of the rebounding plate 10. Across from the bottom of the bore of the inspection glass 12 and the pointer 13, that is, the indicator rod 9, a pressure spring 14 is supported. The scale for reading the respective flow quantity is located in a sleeve-shaped scale carrier 15, which is arranged around the inspection glass 12. The principle construction and function of such a flow meter are known to those skilled in the art and do not need to be described any further.

As can be seen in FIG. 1, the basic component 11 of the indicator element 3, which is screwed into the distribution pipe 4 by an external screw thread 16, extends within the cross section of the distribution pipe 4 into a cylindrical attachment 17. The cylindrical attachment 17 features an internal bore, through which the indicator rod 9 is vertically slidable. According to the invention, a lower portion 18 of the cylindrical attachment 17, which has limited play towards an upper front edge 19 of a connecting pipe 20 of the measuring element 2 extending into the distribution pipe 4, is designed as a filter. In the illustrated embodiment, the lower portion 18 has a number of slits 21 extending parallel to an axis, e.g., the flow direction, of the flow meter and are evenly distributed around the perimeter of the attachment 18.

Figure 2:
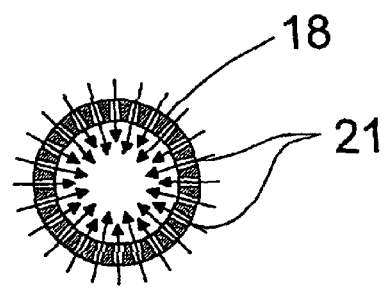
FIG. 2 is a cross section through the flow meter along the line II—II in FIG. 1.

The distribution of the longitudinal slits 21 and the flow through the lower portion 18 thus achieved is illustrated in FIG. 2 in a cross section through the lower portion 18 along line II—II shown in FIG. 1. It can also be seen here that the width of the longitudinal slits increases in the direction of the flow, that is, from the outside to the inside, to enforce the effectiveness of the filter and to keep out potential dirt particles. A suitable size of the longitudinal slits is approximately 0.8×6.0 mm so that particles measuring less than 0.8 mm can potentially pass into the measuring zone, which reduces the risk of blocking the Indicator rod considerably.

In FIG. 3, the basic component 11 of the indicator element 3 is shown in several different illustrations. While FIG. 3*a* shows the basic component 11—much like in FIG. 1—in (full) view and FIG. 3*d* in diagonal view, the insertion of the filter element into the basic component is described with reference to FIGS. 3*b* and 3*c*.

The lower portion 18 of the cylindrical attachment 17 having the longitudinal slits 21 is, for practical purposes, designed as an insert, which can be inserted from below into an internal bore 22 of the cylindrical attachment 17 of the basic component 11. Thus, the lower portion 18 can be made of materials, which can be different from the material that the basic component 11 is made of, for example, plastic of suitably robust consistency. On its outer perimeter, the lower portion 18 can have a ring bulge 23, or protrusions that are provided across from each other, and which pliably lock into a groove when inserted into a lower area 22*a* of the internal bore 22 and thus assure firm engagement. It goes without saying that other means of installation are possible, for example, screwing (the insert) into position.

The lower portion 18 can also include a guide (not shown) for the indicator rod 9, namely in a central bore 24. Among other things, it makes sense for installation reasons to practically assemble the complete indicator element 3 from below so that first the inspection glass 12 including a suitable O-Ring seal is inserted into the internal bore 22 of the cylindrical attachment 17, and by inserting the lower portion 18 with the indicator rod 9 and the rebounding plate 10, the indicator element 3 is fixed into position.

From a flow-technical standpoint, designing the filter to be installed ahead, e.g. upstream, of the rebounding plate as longitudinal slits 21 has the advantage that the flow is divided into individual flow threads thus smoothing the turbulent flow so that the indicator is calmer and, therefore, more precise. In this way, the filter also has a noise-reducing effect.

Figure 4:
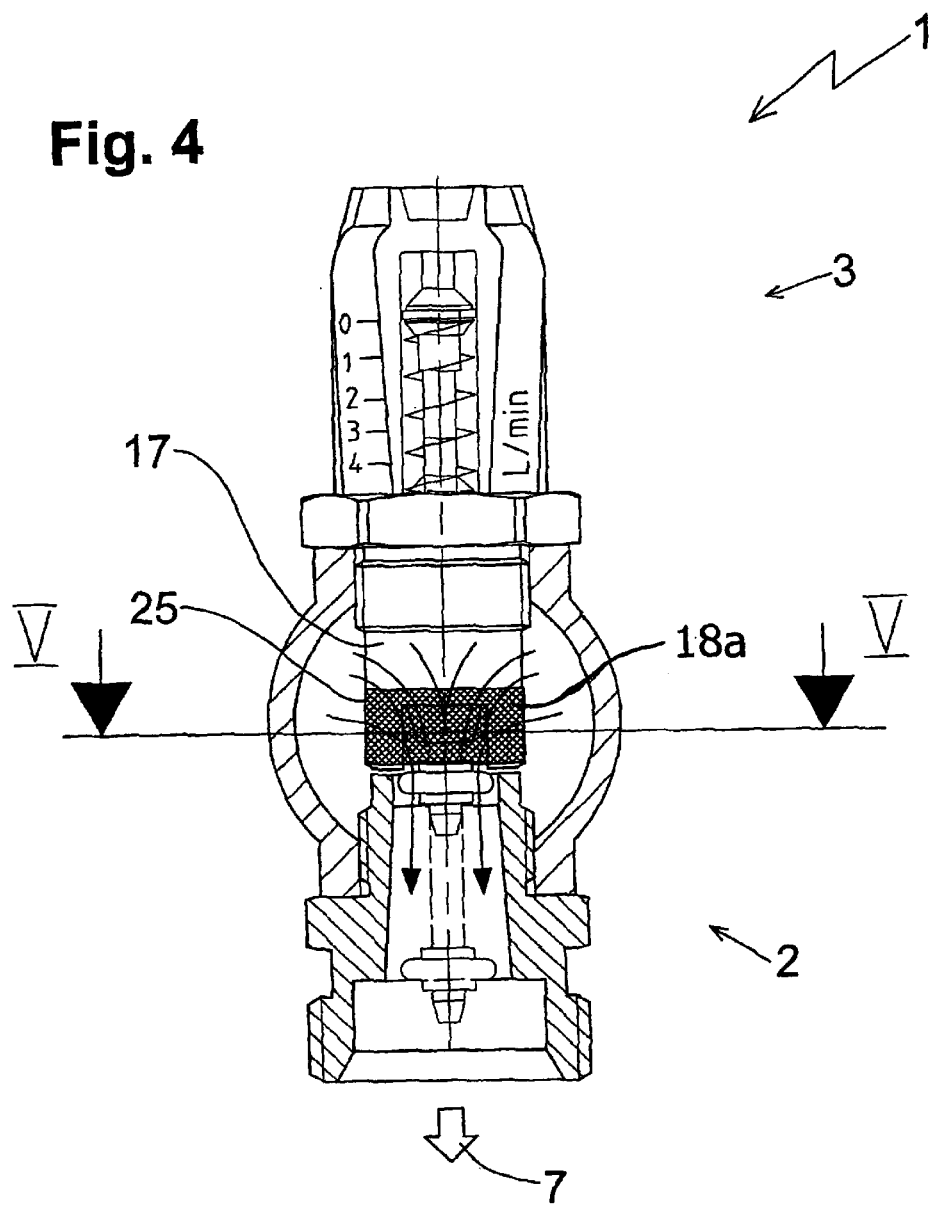
FIG. 4 is an illustration of an alternate embodiment of the flow meter of FIG. 1.
Figure 5:
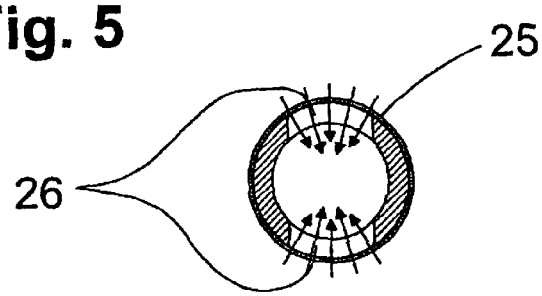
FIG. 5 is a cross section through the flow meter along the line V-V in FIG. 4.

In FIGS. 4 and 5, an alternate embodiment is illustrated, whereby a lower portion 18*a* of the attachment 17 is designed as an insert for the attachment, as described above. In this embodiment, the filter is installed ahead of the rebounding plate 10 and is designed as a close-meshed screen 25 encircling the lower portion 18*a*. The lower portion 18*a* of this embodiment has openings 26 that are provided on opposite sides of the lower portion 18*a*, with the heating medium flowing in the direction of the arrows.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A flow meter comprising:
   a measuring element for measuring a flow of a medium; and
   an indicator element for indicating a flow of the medium,
   wherein the indicator element includes a basic component having a cylindrical portion extending into a distribution pipe through which an indicator rod having a rebounding plate extends into the measuring element and is vertically movable therein, and
   wherein a filter is provided upstream of the rebounding plate in the flow direction of the medium.

2. The flow meter according to claim 1, wherein the basic component extends into a cylindrical attachment that influences the flow towards the rebounding plate, and wherein a lower portion of the cylindrical attachment is designed as the filter.

3. The flow meter according to claim 2, wherein the lower portion of the cylindrical attachment is provided with a plurality of slits that are distributed around a circumference of the lower portion and are parallel to an axis formed by the flow direction of the medium through the measuring element.

4. The flow meter according to claim 3, wherein the slits are evenly distributed around the circumference of the lower portion of the cylindrical attachment.

5. The flow meter according to claim 3, wherein a width of the slits increases in the direction of the flow.

6. The flow meter according to claim 3, wherein at a point of entry of the medium, the slits have a width of 0.5 to 1.0 mm.

7. The flow meter according to claim 6, wherein the slits have a width of 0.8 mm.

8. The flow meter according to claim 2, wherein the lower portion of the attachment is designed as an insert, which is connectable to the attachment by insertion into the cylindrical attachment.

9. The flow meter according to claim 8, wherein the indicator rod is guided in the insert vertically slidable.

10. The flow meter according to claim 2, wherein the lower portion is made of plastic.

11. The flow meter according to claim 1, wherein the flow meter is used for warm water heating systems.

12. The flow meter according to claim 1, wherein the filter is between the indicator element and the measuring element.

13. A flow meter comprising:
    an indicator element for indicating a flow rate of a medium through the flow meter via a rebounding plate that is slidably attached to the indicator element;
    a measuring element having a measuring bore extending along an axis, the axis being substantially parallel to a flow direction of the medium, the rebounding plate slidably extending into the measuring bore of the measuring element; and a cylindrical attachment being provided between the indicator element and the measuring element, the cylindrical attachment having an internal bore for enabling the rebounding plate to extend slidably therethrough from the indicator element to the measuring element, the internal bore of the cylindrical attachment having a diameter that is adapted to fixedly receive an insert, the insert having a plurality of apertures provided therein for filtering dirt particles from the medium.

14. The flow meter according to claim 13, wherein the apertures that are provided in the insert for filtering dirt particles from the medium have a greater width on an inner circumference of the insert than on an outer circumference of the insert.

15. The flow meter according to claim 13, wherein a mesh screen is provided to substantially cover a medium entrance of the apertures, which are provided on the insert.

16. The flow meter according to claim 13, wherein the insert has two apertures on a circumferential side of the insert.

17. The flow meter according to claim 16, wherein the two apertures are substantially across from one another on the circumferential side of the insert.

18. The flow meter according to claim 13, wherein the flow meter is a forward-flow flow meter.

* * * * *